(12) United States Patent
Hoekman et al.

(10) Patent No.: US 12,326,580 B2
(45) Date of Patent: Jun. 10, 2025

(54) MULTIVIEW DISPLAY AND METHOD USING EFFECTIVE LIGHT SOURCES

(71) Applicant: LEIA Inc., Menlo Park, CA (US)

(72) Inventors: Thomas Hoekman, Menlo Park, CA (US); David A. Fattal, Mountain View, CA (US)

(73) Assignee: LEIA Inc., Menlo Park, CA (US)

( * ) Notice: Subject to any disclaimer, the term of this patent is extended or adjusted under 35 U.S.C. 154(b) by 0 days.

(21) Appl. No.: 18/720,449

(22) PCT Filed: Feb. 24, 2022

(86) PCT No.: PCT/US2022/017767
§ 371 (c)(1),
(2) Date: Jun. 14, 2024

(87) PCT Pub. No.: WO2023/163706
PCT Pub. Date: Aug. 31, 2023

(65) Prior Publication Data
US 2025/0060611 A1    Feb. 20, 2025

(51) Int. Cl.
G02B 30/33         (2020.01)
F21V 8/00          (2006.01)
G02B 3/00          (2006.01)
H04N 13/32         (2018.01)
H04N 13/351        (2018.01)

(52) U.S. Cl.
CPC .......... *G02B 30/33* (2020.01); *G02B 3/0056* (2013.01); *G02B 6/005* (2013.01); *H04N 13/32* (2018.05); *H04N 13/351* (2018.05)

(58) Field of Classification Search
CPC ................................ H04N 13/32; G02B 30/33

USPC ........................................................... 349/15
See application file for complete search history.

(56) References Cited

U.S. PATENT DOCUMENTS

| 9,946,076 B2 | 4/2018 | Smits et al. |
| 2005/0281029 A1 | 12/2005 | Inamoto |
| 2012/0307357 A1 | 12/2012 | Choi et al. |
| 2018/0224663 A1 | 8/2018 | Pijlman |

(Continued)

FOREIGN PATENT DOCUMENTS

| CN | 112925098 A | 6/2021 |
| TW | I696006 B | 6/2020 |

(Continued)

OTHER PUBLICATIONS

"International Application Serial No. PCT/US2022/017767, International Search Report mailed Nov. 22, 2022", 4 pgs.

(Continued)

*Primary Examiner* — Christopher M Raabe
(74) *Attorney, Agent, or Firm* — Schwegman, Lundberg & Woessner, P.A.

(57) ABSTRACT

A multiview display and method employ an array of lenses to provide effective light sources from semi-collimated light. The multiview display includes a semi-collimated backlight configured to provide the semi-collimated light, an array of light valves arranged as multiview pixels, and an array of lenses disposed between the semi-collimated backlight and the array of lenses. Each lens of the array of lenses is configured to provide an effective light source at a focal plane of the lens to illuminate a corresponding multiview pixel.

22 Claims, 5 Drawing Sheets

(56) References Cited

U.S. PATENT DOCUMENTS

| | | |
|---|---|---|
| 2020/0033621 A1 | 1/2020 | Fattal et al. |
| 2020/0150489 A1 | 5/2020 | Ma et al. |
| 2021/0255113 A1 | 8/2021 | Kester et al. |
| 2022/0179232 A1* | 6/2022 | Fattal ................... G02B 5/0278 |
| 2022/0236473 A1* | 7/2022 | Fattal ................... G02B 5/1861 |

FOREIGN PATENT DOCUMENTS

| | | |
|---|---|---|
| TW | 202401095 A | 1/2024 |
| TW | 1866061 | 12/2024 |
| WO | WO-2023163706 A1 | 8/2023 |

OTHER PUBLICATIONS

"International Application Serial No. PCT/US2022/017767, Written Opinion mailed Nov. 22, 2022", 5 pgs.
"Taiwanese Application Serial No. 112104672, Office Action mailed Mar. 6, 2024", W/English Translation, 18 pgs.
"Taiwanese Application Serial No. 112104672, Response filed May 31, 2024 to Office Action mailed Mar. 6, 2024", w/ English Claims, 17 pgs.
"European Application Serial No. 22929140.6, Response to Communication pursuant to Rules 161(1) and 162 EPC filed Jan. 15, 2025", 6 pgs.

\* cited by examiner

MULTIVIEW DISPLAY AND METHOD USING EFFECTIVE LIGHT SOURCES

CROSS-REFERENCE TO RELATED APPLICATIONS

This application is a U.S. National Stage Filing under 35 U.S.C. 371 from International Application No. PCT/US2022/017767, filed on Feb. 24, 2022, and published as WO 2023/163706, which application is incorporated herein by reference in its entirety.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein employ effective light sources to illuminate an array of light valves and provide a multiview image. In particular, in accordance with the principles described herein, a multiview display is provided comprising a semi-collimated light backlight configured to emit semi-collimated light and an array of lenses configured focus different portions of the semi-collimated light to provide a plurality of effective light sources. In turn, each of the effective light sources of the effective light source plurality is configured to illuminate different sets of light valves or multiview pixels of the light valve array with directional light beams. According to various embodiments, the directional light beams have directions corresponding to view directions of the multiview display or equivalently of the multiview image displayed by the multiview display. Modulation of the directional light beams by light valves of the light valve array provide the multiview image. Unlike conventional lenticular displays, various embodiments described herein may allow independent adjustment of inter-view spacing and output collimation.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of the multiview displays described herein include, but are not limited to, mobile telephones (e.g., smart phones), watches, tablet computers, mobile computers (e.g., laptop computers), personal computers and computer monitors, automobile display consoles, cameras displays, and various other mobile as well as substantially non-mobile display applications and devices.

Figure 1:
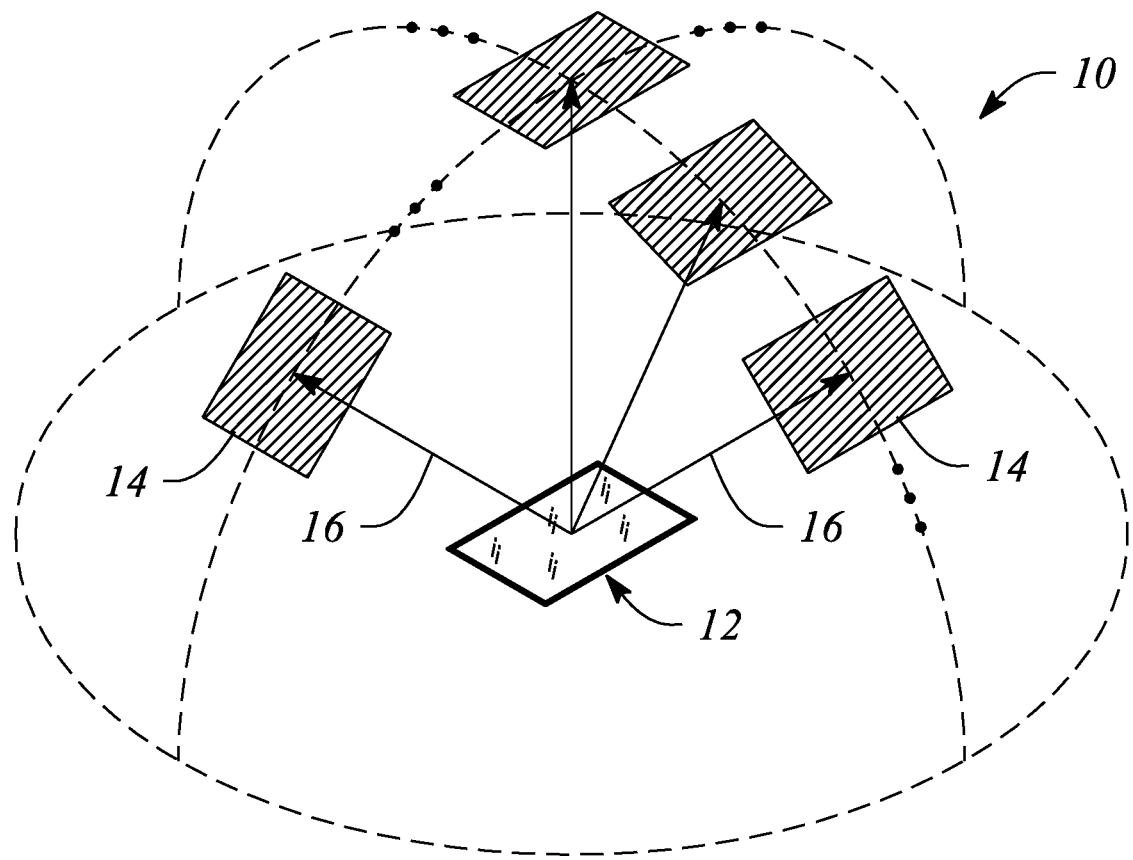
FIG. 1 illustrates a perspective view of a multiview display in an example, in accordance with some embodiments of the principles described herein.

FIG. 1 illustrates a perspective view of a multiview display 10 in an example, in accordance with an embodiment consistent with the principles described herein. As illustrated in FIG. 1, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions. The different views 14 are illustrated as shaded polygonal boxes at the termination of the arrows (i.e., depicting the view directions 16). Only four views 14 and four view directions 16 are illustrated, all by way of example and not limitation. Note that while the different views 14 are illustrated in FIG. 1 as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 2:
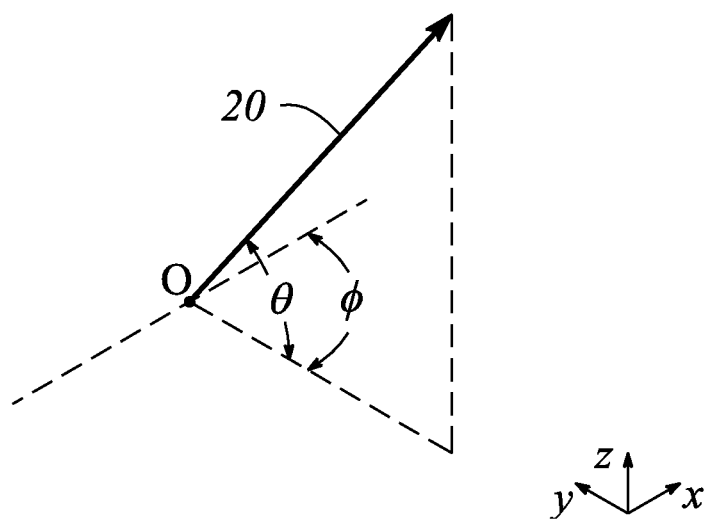
FIG. 2 illustrates a graphical representation of the angular components of a light beam having a particular principal angular direction corresponding to a view direction of a multiview display in an example, in accordance with some embodiments of the principles described herein.

FIG. 2 illustrates a graphical representation of the angular components $\{\theta, \phi\}$ of a light beam 20 having a particular principal angular direction corresponding to a view direction (e.g., view direction 16 in FIG. 1) of a multiview display in an example, in accordance with some embodiments of the principles described herein. In addition, the light beam 20 is emitted or emanates from a particular point, by definition herein. That is, by definition, the light beam 20 has a central ray associated with a particular point of origin within the multiview display. FIG. 2 also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1 y_1\}$ in each of the different views of a multiview image, while a second multiview pixel may have individual view pixels located at $\{x_2 y_2\}$ in each of the different views, and so on. In some embodiments, a number of view pixels in a multiview pixel may be equal to a number of views of the multiview display.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (e.g., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

By definition herein, 'semi-collimated' light is defined as light having a collimation factor resulting in a cone angle that is greater than a cone angle of the view of a multiview image or multiview display, but less than, and in some embodiments substantially less than, a cone angle of one hundred eighty degree (i.e., <<180°). In particular, in some embodiments, collimation factor of the semi-collimated light may provide a cone angle of the semi-collimated light that is greater than about thirty degrees (e.g., >30°), but less than 180°. In other embodiments, the semi-collimated light cone angle may be greater than about forty degrees (e.g., >40°), or greater than about sixty degrees (e.g., >60°), or greater than about ninety degrees (e.g., >90°), or greater than about one hundred twenty degrees (e.g., >120°). However, in each of these embodiments the collimation factor of semi-collimated light results in a cone angle that is strictly less than 180°. In some embodiments, the semi-collimated light cone angle may be defined as about the same as a viewing angle of an LCD computer monitor, an LCD tablet, an LCD television, or a similar digital display device meant for semi-collimated viewing (e.g., about ±40-65°). That is, the semi-collimated light may be provided by a backlight that is used in one or more of an LCD computer monitor, an LCD tablet, an LCD television, or even a mini-LED or micro-LED television or monitor, for example.

Further, as used herein, the article 'a' is intended to have its ordinary meaning in the patent arts, namely 'one or more'. For example, 'a lens' means one or more lenses and as such, 'the lens' means 'the lens or lenses' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
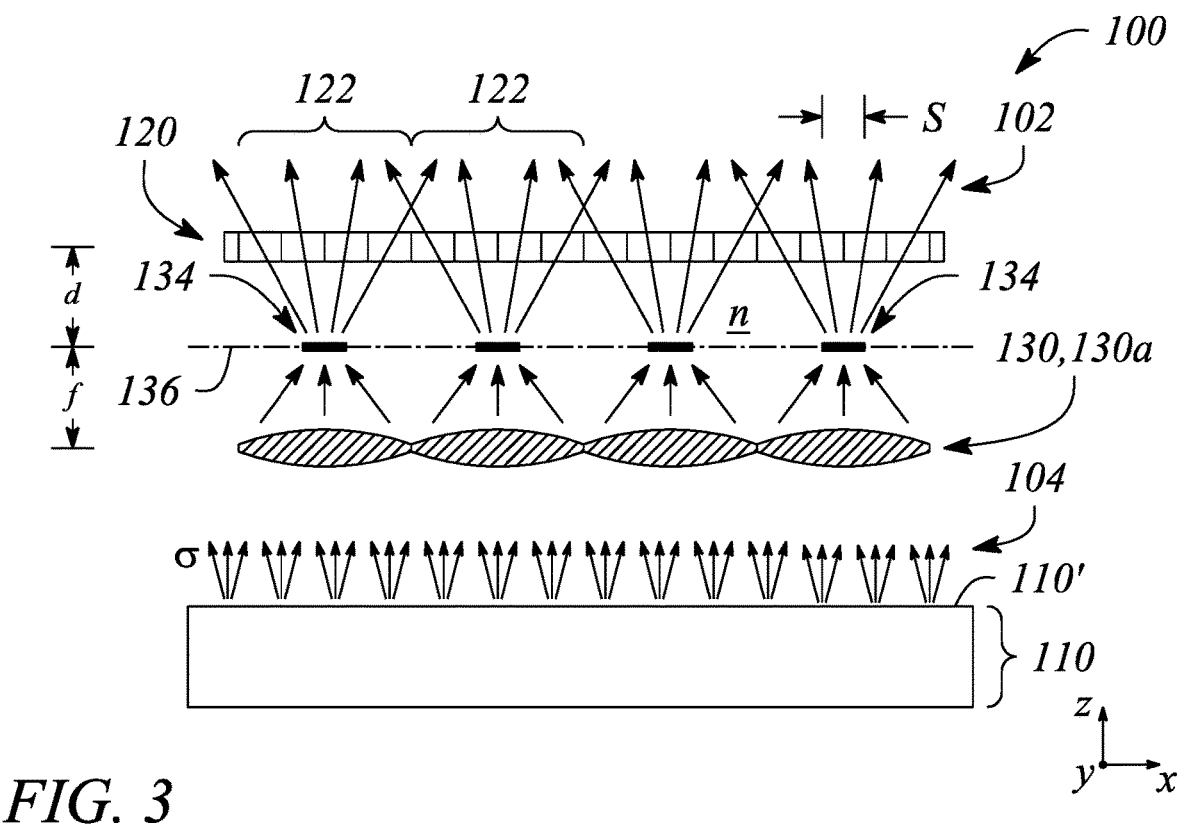
FIG. 3 illustrates a cross-sectional view of a multiview display in an example, according to an embodiment of the principles described herein.
Figure 4:
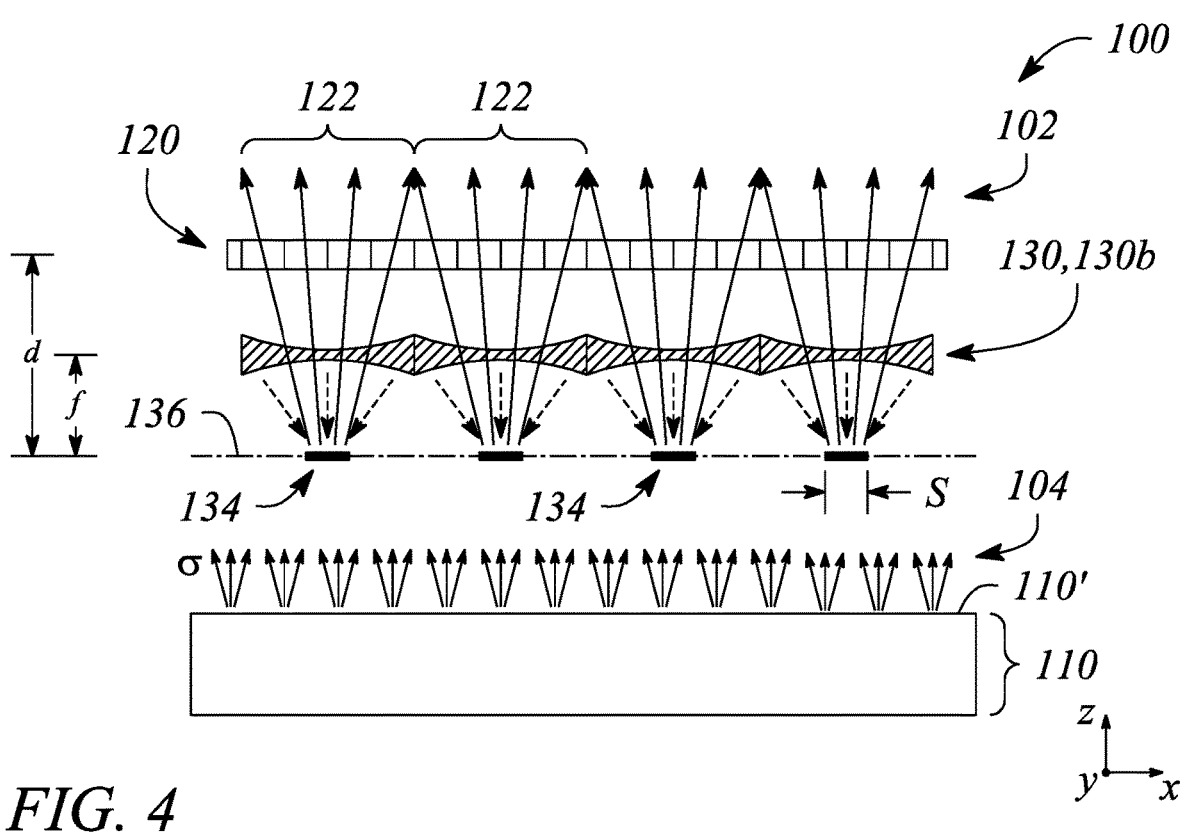
FIG. 4 illustrates a cross-sectional view of a multiview display in an example, according to another embodiment of the principles described herein.

According to some embodiments of the principles described herein, a multiview display is provided. FIG. 3 illustrates a cross-sectional view of a multiview display 100 in an example, according to an embodiment of the principles described herein. FIG. 4 illustrates a cross-sectional view of a multiview display 100 in an example, according to another embodiment of the principles described herein. According to various embodiments, the multiview display 100 is configured to provide a plurality of directional light beams 102 representing view pixels and having view directions corresponding to views of the multiview display 100 or equivalently of a multiview image displayed by the multiview display 100.

As illustrated, the multiview display 100 comprises a semi-collimated backlight 110 configured to emit semi-collimated light 104 having a predetermined collimation factor. According to various embodiments, the semi-collimated backlight 110 may have a planar or substantially planar light-emitting surface 110' configured to provide or emit the semi-collimated light 104. The semi-collimated light 104 provided by the semi-collimated backlight 110 is illustrated in FIGS. 3-4 as a plurality of arrow and having the predetermined collimation factor $\sigma$.

According to various embodiments, the semi-collimated backlight 110 may be substantially any backlight having a light-emitting surface 110' that is configured to provide the semi-collimated light 104 having the predetermined collimation factor $\sigma$. For example, the semi-collimated backlight 110 may be a direct-emitting or directly illuminated planar backlight. Direct-emitting or directly illuminated planar backlights include, but are not limited to, a backlight panel employing a planar array of cold-cathode fluorescent lamps (CCFLs), neon lamps, or light emitting diodes (LEDs) configured to directly illuminate the planar light-emitting surface 110' and provide the semi-collimated light 104. In particular, the semi-collimated backlight 110 may comprise a plurality of active light emitters arranged on a substrate. For example, semi-collimated backlight 110 may comprise an array of mini-LEDs or even micro-LEDs distributed across a substrate and configured to provide the semi-collimated light 104. An electroluminescent panel (ELP) is another non-limiting example of a direct-emitting planar backlight that may be employed as the semi-collimated backlight 110, in yet other embodiments.

In other embodiments, the semi-collimated backlight 110 may comprise a planar backlight that employs an indirect light source. Such indirectly illuminated backlights may include, but are not limited to, various forms of edge-coupled or so-called 'edge-lit' backlights. For example, the semi-collimated backlight 110 may comprise a light guide configured to guide light along a length of the light guide as guided light, the guided light being collimated according to the predetermined collimation factor. The semi-collimated backlight 110 may further comprise one or more angle-preserving scattering elements distributed across the light guide length, the angle-preserving scattering element or elements being configured to scatter out a portion of the collimated guided light as the emitted semi-collimated light 104.

Figure 5:
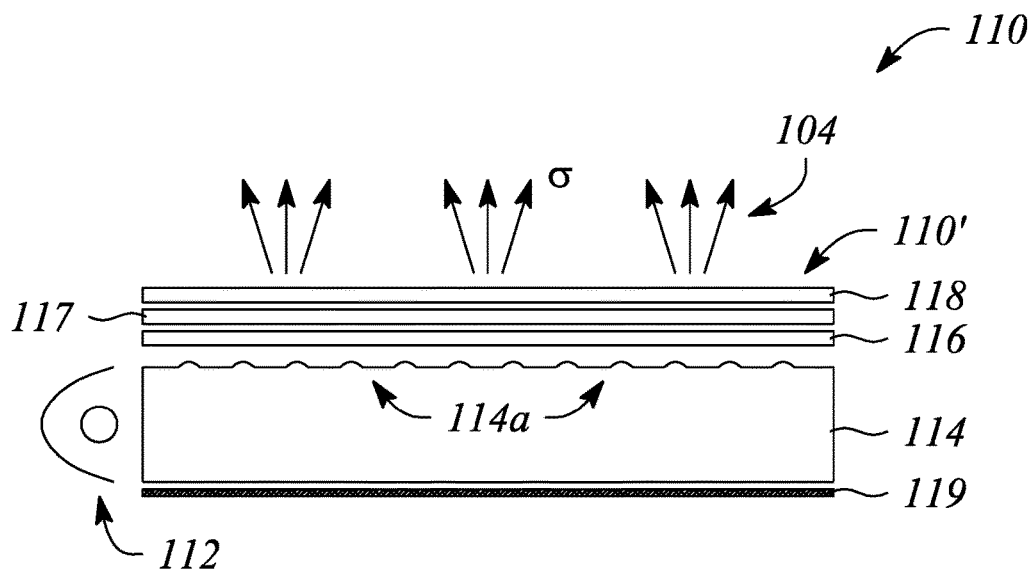
FIG. 5 illustrates a cross-sectional view of a semi-collimated backlight in an example, according to an embodiment consistent with the principles described herein.

FIG. 5 illustrates a cross-sectional view of a semi-collimated backlight 110 in an example, according to an embodiment consistent with the principles described herein. As illustrated in FIG. 5, the semi-collimated backlight 110 is an edge-lit backlight and comprises a light source 112 coupled to an edge of the semi-collimated backlight 110. The edge-coupled light source 112 is configured to produce light within the semi-collimated backlight 110.

Further, as illustrated by way of example and not limitation, the semi-collimated backlight 110 comprises a guiding structure 114 or 'light guide' having a substantially rectangular cross section with parallel opposing surfaces (i.e., a rectangular-shaped guiding structure) along with a plurality of extraction features 114*a*. As illustrated, extraction features 114*a* are disposed at a surface (i.e., top surface) of the guiding structure 114 of the semi-collimated backlight 110, by way of example and not limitation. However, the in various other embodiments, the extraction features 114*a* may be located at a bottom surface or even within a material of the guiding structure 114.

Light from the edge-coupled light source 112 and guided within the rectangular-shaped guiding structure 114 may be redirected, scattered out of or otherwise extracted from the guiding structure 114 by the extraction features 114*a* to provide the semi-collimated light 104, according to various embodiments. The extraction features 114*a* may comprise angle-preserving scatter elements, for example. The light provided by the edge-coupled light source 112 may be collimated according to a predetermined collimation factor that is proportional to the predetermined collimation factor of the semi-collimated light 104, for example, The illustrated semi-collimated backlight 110 of FIG. 5 may be activated by turning on the edge-coupled light source 112, e.g., also illustrated in FIGS. 3-4 using cross-hatching of the light source 112, for example.

In some embodiments, the semi-collimated backlight 110, whether direct-emitting or edge-lit (e.g., as illustrated in FIG. 5), may further comprise one or more additional layers or films including, but not limited to, a diffuser or diffusion layer, a brightness enhancement film (BEF), and a polarization recycling film or layer. For example, one or both of a diffuser and a BEF may be configured to either increase or decrease an emission angle of the semi-collimated light 104 when compared to light provided by semi-collimated backlight 110 alone. As such, one of both of the diffuser and the BEF may be employed to selectively adjust and control the collimation factor σ of the semi-collimated light 104 emitted by the semi-collimated backlight 110. Brightness enhancement films (BEF) are available, for example, from 3M Optical Systems Division, St. Paul, MN as a Vikuiti™ BEF II which are micro-replicated enhancement films that utilize a prismatic structure to provide up to a 60% brightness gain. The polarization recycling layer may be configured to selectively pass a first polarization while reflecting a second polarization back toward the rectangular-shaped guiding structure 114. The polarization recycling layer may comprise a reflective polarizer film or dual brightness enhancement film (DBEF), for example. Examples of DBEF films include, but are not limited to, 3M Vikuiti™ Dual Brightness Enhancement Film available from 3M Optical Systems Division, St. Paul, MN. In another example, an advanced polarization conversion film (APCF) or a combination of brightness enhancement and APCF films may be employed as the polarization recycling layer.

FIG. 5 illustrates the semi-collimated backlight 110 further comprising a diffuser 116 adjacent to guiding structure 114. Further, illustrated in FIG. 5 are a brightness enhancement film 117 and a polarization recycling layer 118. In some embodiments, the semi-collimated backlight 110 further comprises a reflective layer 119 adjacent to a surface of the guiding structure 114 opposite to the planar light-emitting surface 110' (i.e., on a back surface), e.g., as illustrated in FIG. 5. The reflective layer 119 may comprise any of a variety of reflective films including, but not limited to, a layer of reflective metal or an enhanced specular reflector (ESR) film. Examples of ESR films include, but are not limited to, a Vikuiti™ Enhanced Specular Reflector Film available from 3M Optical Systems Division, St. Paul, MN.

Referring again to FIGS. 3 and 4, the multiview display 100 further comprises an array of light valves 120. According to various embodiments, light valves 120 of the light valve array are arranged as multiview pixels 122, as illustrated. The light valves 120 of the light valve array are configured to modulate light to form an image, e.g., a multiview image of the multiview display 100. In various embodiments, any of a variety of different types of light valves may be employed as the light valves 120 of the light valve array including, but not limited to, one or more of liquid crystal light valves, electrophoretic light valves, and light valves based on or employing electrowetting.

The multiview display 100 illustrated in FIGS. 3 and 4 further comprises an array of lenses 130 disposed between the light valve array and the semi-collimated backlight. As illustrated, each lens 130 of the lens array corresponds to a different multiview pixel 122. Further, each lens 130 of the lens array is configured to receive the semi-collimated light 104 and provide from the received semi-collimated light 104 an effective light source 134. That is, each of the lenses 130 is configured to focus a portion of the semi-collimated light 104 and form a respective effective light source 134 at or in a focal plane 136 of the lens 130. According to various embodiments, the effective light source 134 formed by the lens 130 has a size between one quarter and two time a size of a light valve 120 of the light valve array. Each effective light source 134 formed by each of the lenses 130, in turn, is configured to illuminate the corresponding different one of the multiview pixels 122 with directional light beams 102 having directions of views of the multiview display 100, according to various embodiments. According to various embodiments, sizing the effective light sources 134 to be between one quarter and two time a size of a light valve 120 may reduce or even eliminate crosstalk between view angles along with crosstalk or overlap between adjacent sets of light valves 120 representing multiview pixels. In addition, the sizing of the effective light sources 134 in this matter may also minimize or in some embodiments even eliminate undesirable moiré artifacts in the multiview display 100.

According to various embodiments, the plurality of directional light beams 102 may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

In some embodiments, the size of the effective light source 134 provided by each lens 130 is about equal to the predetermined collimation factor of the semi-collimated light 104 emitted by the semi-collimated backlight 110 multiplied by a focal length of the lens 130 and divided by a value of a refractive index of a material at the focal plane 136. That is, according to some embodiments, the effective light source size S of the effective light source 134 provided by a lens 130 may be given by equation (1) as $$S = \frac{\sigma \cdot f}{n} \quad (1)$$

where $\sigma$ is the predetermined collimation factor of the semi-collimated light 104 incident on the lens 130, f is the focal length of the lens 130, and n is a refractive index of a material in a vicinity of the effective light source 134.

In some embodiments, the predetermined collimation factor $\sigma$ of the semi-collimated light 104 emitted by the semi-collimated backlight 110 may be chosen to be proportional to a distance between the effective light source 134 and the light valve array. In particular, FIG. 3 illustrates the distance d between the effective light source 134 and light valves 120 of the light valve array. For example, once the distance d is determined (e.g., according to manufacturing constraints), the predetermined collimation factor $\sigma$ as provided by equation (1) may be scaled proportionally to the determined distance d. The proportionality may ensure that the effective light source 134 properly illuminates the multiview pixel 122 corresponding to the effective light source 134, for example.

In some embodiments, lenses 130 of the lens array may comprise converging lenses. For example, the lenses 130 may be positive or convex lenses 130a, as illustrated in FIG. 3. When the lens 130, 130a comprises a converging lens, the focal plane 136 as well as the effective light source 134 provided at the focal plane 136 is disposed between the array of lenses 130, 130a and the array of light valves 120, as illustrated in FIG. 3.

In other embodiments (e.g., as illustrated in FIG. 4), lenses 130 of the lens array may comprise diverging lenses (i.e., divergent or negative lenses) and the effective light sources 134 may be provided at the focal plane 136 between the lenses 130 and the semi-collimated backlight 110. That is, the focal plane 136 of lenses 130 comprising the diverging or convex lens 130b is located below the lenses 130, 130b between the lens array and the semi-collimated backlight 110, as illustrated in FIG. 4. Thus, the effective light sources 134 formed by the diverging lenses of the lens array are disposed between the lenses 130, 130b and the semi-collimated backlight 110, as illustrated in FIG. 4.

According to some embodiments, lenses 130 of the array of lenses 130 may comprise one or more of refractive lenses, diffractive lenses (e.g., a Fresnel lens), and gradient index lenses. FIGS. 3 and 4 illustrate the lenses 130 as refractive lenses, by way of example and not limitation. In other embodiments, lenses 130 of the lens array may comprise varifocal lenses configured to facilitate adjusting a location of the focal plane to change a viewing position of the multiview display. For example, a focusing power of the varifocal lenses may be adjusted in real-time by a controller to change the viewing position.

Figure 6:
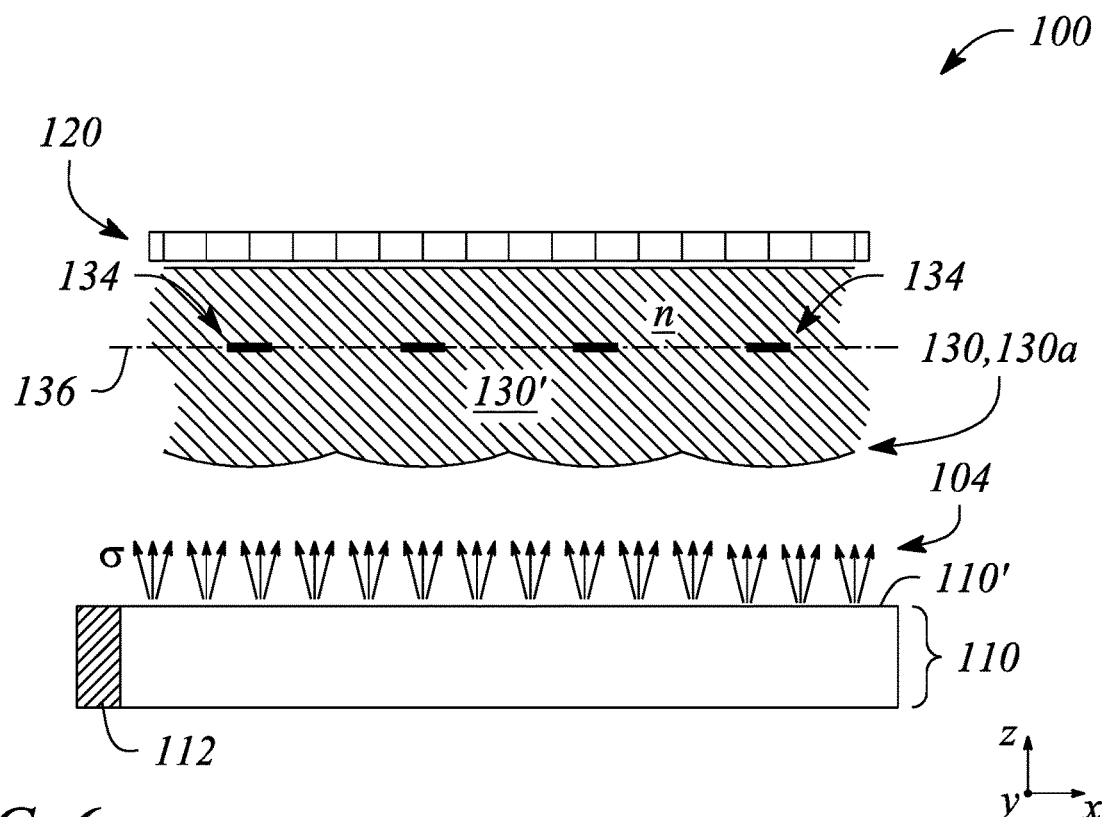
FIG. 6 illustrates a cross-sectional view of a multiview display in an example, according to an embodiment of the principles described herein.

In some embodiments in which the lenses 130 of the lens array comprise refractive lenses, a material of the refractive lenses may be integral with a material at the focal plane 136. FIG. 6 illustrates a cross-sectional view of a multiview display 100 in an example, according to an embodiment of the principles described herein. In particular, the multiview display 100 illustrated in FIG. 6 includes a material 130' of the array of lenses 130 which extends to or approximately to the array of light valves 120. As illustrated, the effective light sources 134 at the focal plane 136 are within the material 130' of the lens array and the refractive index n in a vicinity of the focal plane 136 is the same as the refractive index n of the material 130' of the array of lenses 130. Extending the material 130' of the lenses 130 in this manner may substantially reduce or even eliminate reflections in between the lenses 130 and the light valve array, for example. FIG. 6 also illustrates the semi-collimated backlight 110 configure to provide semi-collimated light 104 from a planar light-emitting surface 110' to illuminate the lenses 130 of the array of lenses 130. FIG. 6 illustrates the lenses 130 as converging or convex lenses 130a, by way of example and not limitation. Although not illustrated, a similar configuration of the multiview display 100 that comprise diverging lenses (e.g., lenses 130b of FIG. 4) may include the material 130' that extends toward the semi-collimated backlight 110 such that the focal plane 136 and effective light sources 134 are within the material 130' between the lens array and the semi-collimated backlight 110. According to various embodiments, the material 130' may comprise an optically transparent dielectric material such as, but not limited to, an optical polymer, an optical glass, or another optical material that is often used to form lenses.

In some embodiments, the lenses 130 of the array of lenses may be arranged in a two-dimensional (2D) array. In these embodiments, the multiview pixels 122 of the light valve array are similarly arranged in a 2D array. The 2D array of multiview pixels 122 may provide a multiview image having full parallax, for example. In other embodiments, lenses 130 of the array of lenses 130 may be cylindrical lenses having an axis extending in first direction and arranged in a one-dimensional (1D) in a second direction across the axis of the cylindrical lenses. In these embodiments, the multiview pixels 122 each comprise a set of light valves arranged in a row that extends in the second direction across the axis of the cylindrical lenses.

In some embodiments, the multiview display 100 further comprises optical baffles between lenses 130 of the lens array. The optical baffles may be configured to block light from passing between adjacent regions of the lens array delineated by the optical baffles. In some embodiments, the optical baffles may comprise an optical absorber material that absorbs light to reduce reflection of incident light from surfaces of the optical baffles. The optical baffles may better define the effective light sources 134 by effectively sectioning the semi-collimated backlight 110 into sections corresponding to each of the lenses 130 and also by reducing crosstalk between effective light sources 134, in some embodiments.

Figure 7:
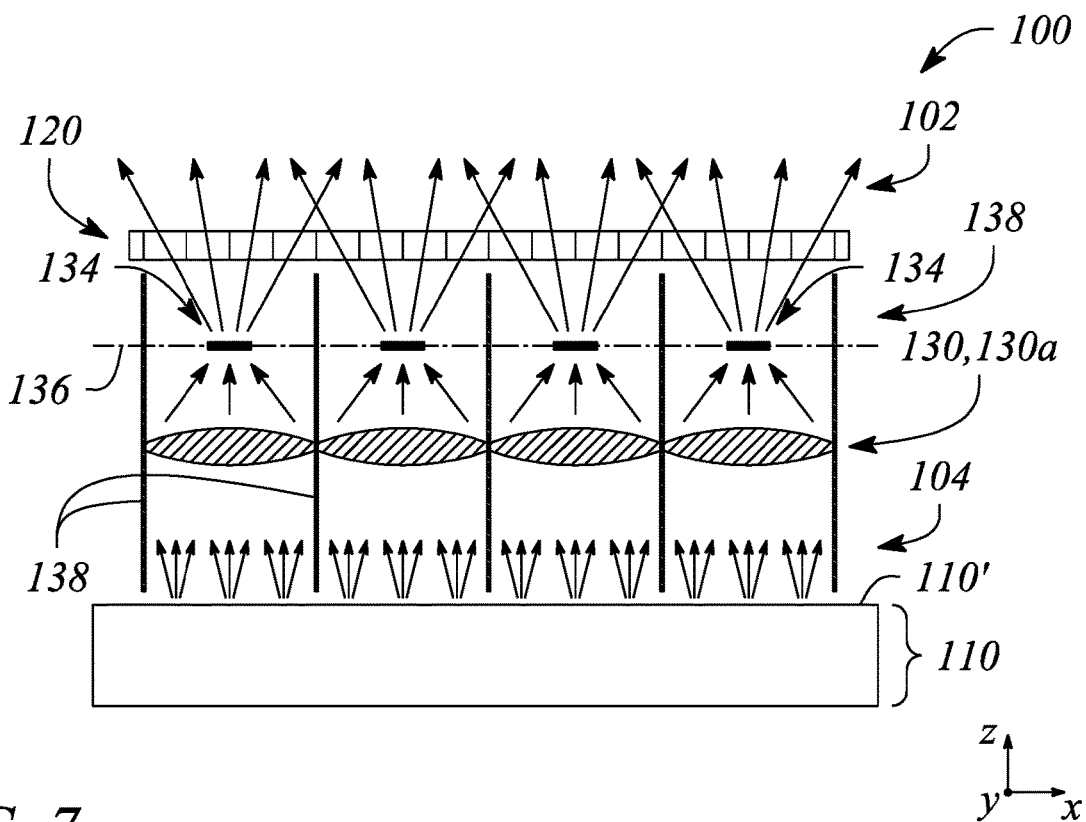
FIG. 7 illustrates a cross-sectional view of a multiview display including optical baffles in an example, according to an embodiment of the principles described herein.

FIG. 7 illustrates a cross-sectional view of a multiview display 100 including optical baffles 138 in an example, according to an embodiment of the principles described herein. As illustrated, the multiview display 100 of FIG. 7 includes the semi-collimated backlight 110, the array of light valves 120, and the array of lenses 130 (for example, convex lenses 130a), as described above with respect to FIG. 3. FIG. 7 further illustrates optical baffles 138 between individual lenses 130 of the lens array. As illustrated, by way of example and not limitation, the optical baffles 138 extend from a vicinity of the semi-collimated backlight 110 to beyond the effective light sources 134 and to a vicinity of the array of light valves 120. In other embodiments (not illustrated), the optical baffles 138 may extend only within a vicinity of the lens array or may extend only part way to either the semi-collimated backlight 110 and the array of light valves 120. In yet other embodiments (not illustrated), the optical baffles 138 may extend from the lens array to about the semi-collimated backlight 110. According to various embodiments, the optical baffles 138 may effectively divide the semi-collimated backlight 110 into segments corresponding to each of the individual lenses 130. Also, while not explicitly illustrated, the optical baffles 138 illustrated in FIG. 7 may be applied to any of the embodiments of the multiview display 100 described herein, e.g., the embodiments of FIGS. 4 and 6.

Figure 8:
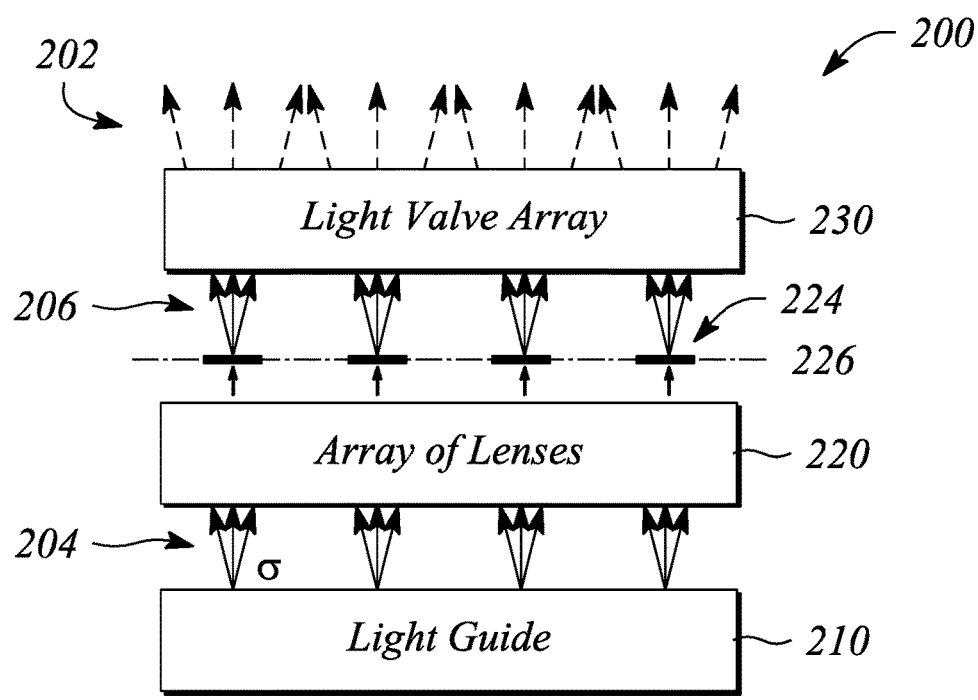
FIG. 8 illustrates a block diagram of a multiview display in an example, according to an embodiment of the principles described herein.

FIG. 8 illustrates a block diagram of a multiview display 200 in an example, according to an embodiment of the principles described herein. As illustrated, the multiview display 200 comprises a light guide 210 configured to emit semi-collimated light 204 having a predetermined, non-zero collimation factor σ. In some embodiments, the light guide 210 may be substantially similar to the semi-collimated backlight 110 of the multiview display 100, described above. In particular, the semi-collimated light 204 and predetermined, non-zero collimation factor σ of the light guide 210 may be substantially similar to the semi-collimated light 104 and predetermined collimation factor σ respectively described above with respect to the semi-collimated backlight 110. In some embodiments, the light guide 210 may comprise a light source (not illustrated) configured to provide light to be guided by the light guide as guided light and a scattering structure configured to scatter the guide light out of the light guide as the semi-collimated light having the predetermined, non-zero collimation factor, e.g., as described above.

The multiview display 200 illustrated in FIG. 8 further comprises an array of lenses 220. According to various embodiments, each lens 220 of the array of lenses 220 is configured to provide an effective light source 224 at a focal plane 226 of the lens 220 using a portion of the semi-collimated light 204. In some embodiments, the array of lenses 220 may be substantially similar to the array of lenses 130 described above with respect to the multiview display 100. For example, a lens 220 of the array of lenses 220 may be a either a convex lens configured to serve as a converging lens (e.g., as described above) or a concave lens configured to serve as a diverging lens (e.g., also as described above). In addition, the lens 220 may comprise one or more of a refractive lens, a diffractive lens, and a gradient lens, in various embodiments.

As illustrated in FIG. 8, the multiview display 200 further comprises an array of light valves 230 arranged in sets or groups of light valves. According to various embodiments, each lens 220 of the array of lenses 220 corresponds to a different one of the sets or groups of light valves 230. According to various embodiments, each of the effect light sources 224 is configured to illuminate the different sets or groups of light valves 230 as illustrated by illumination light 206.

In some embodiments, the array of light valves 230 may be substantially similar to the array of light valves 120 of the above-described multiview display 100. In particular, the set or group of light valves 230 may be a multiview pixel of the multiview display 200. According to various embodiments, effective light sources 224 provided by the array of lenses 220 are configured to provide the illumination light 206 comprising directional light beams having directions corresponding to view directions of a multiview image. Further, the array of light valves 230 are configured to modulate the directional light beams of the illumination light 206 to provide the multiview image, according to various embodiments. Once modulated by the light valves (or sets of light valves), the directional light beams 202 represent view pixels of a multiview image displayed by the multiview display 200, according to various embodiments. Modulated directional light beams 202 are illustrated using dashed line arrows in FIG. 8.

In some embodiments, an effective light source 224 provided by a lens 220 of the array of lenses 220 has a size that is between one quarter and two times a size of a light valve 230 of the light valve array. In some embodiments, a size of the effective light source provided by each lens is equal to the predetermined, non-zero collimation factor of the semi-collimated light 204 multiplied by a focal length of the lens 220 and divided by a value of a refractive index of a material between the array of lenses and the light valve array. As such, the predetermined, non-zero collimation factor may be chosen to control or determine the size of the effective light source. In some embodiments in which a lens 220 of the array of lenses 220 is a refractive lens, a refractive material of the refractive lens may extend from the array of lenses to the light valve array.

As described above, each effective light source 224 may have a size that is between one quarter and two times a size of a light valve 230 of the light valve array. According to some embodiments, this relative size relationship of the effective light source 224 and the light valve 230 may reduce, or in some examples to minimize, dark zones (i.e., Moiré) between views of the multiview display 200, while at the same time reducing, or in some examples minimizing, an overlap or crosstalk between views of the multiview display 200 or equivalent of the multiview image, e.g., as was described above.

Figure 9:
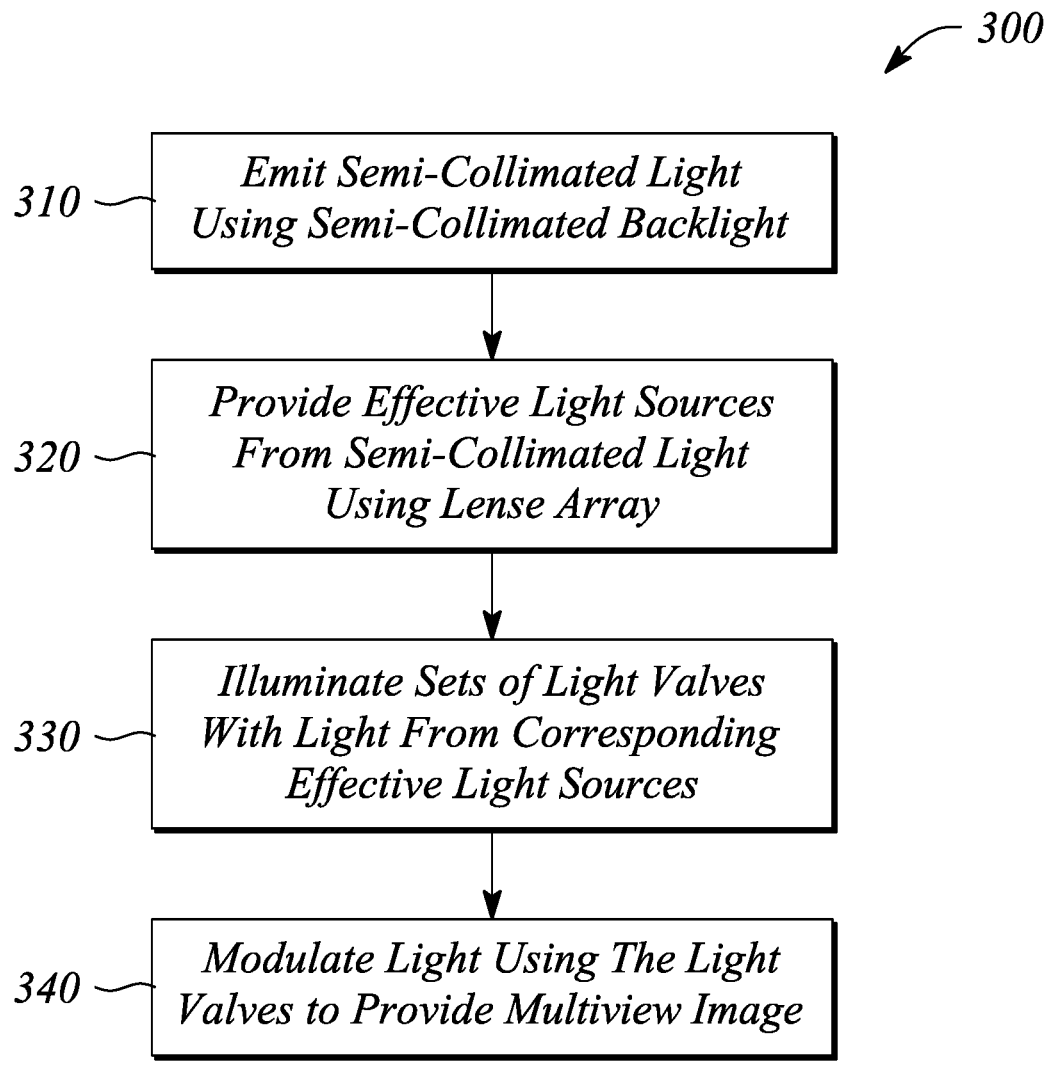
FIG. 9 illustrates a flow chart of a method of multiview display operation in an example, according to an embodiment of the principles described herein.

According to other embodiments of the principles described herein, a method of multiview display operation is provided. FIG. 9 illustrates a flow chart of a method 300 of multiview display operation in an example, according to an embodiment of the principles described herein. As illustrated, the method 300 of multiview display operation comprises emitting 310 semi-collimated light using a semi-collimated backlight. In some embodiments, the semi-collimated backlight may be substantially similar to the semi-collimated backlight 110, as described above with respect to the multiview display 100. Further, the emitted 310 semi-collimated light may be substantially similar to the semi-collimated light 104 of the above-described multiview display 100. That is the emitted 310 semi-collimated light has a predetermined, non-zero collimation factor.

The method 300 of multiview display operation illustrated in FIG. 9 further comprises providing 320 a plurality of effective light sources from the semi-collimated light using an array of lenses disposed between the semi-collimated backlight and an array of light valves. According to various embodiments, each effective light source of the effective light source plurality is provided by a different lens of the array of lenses at a focal plane of the different lens. In some embodiments, the array of lenses may be substantially similar to the array of lenses 130 described above with respect to the multiview display 100. Further, the effective light sources provided by individual lenses of the array of lenses may be substantially similar to the effective light sources 134, as described above. In particular, each effective light source is provided 320 having a size between one quarter and two times a size of a light valve of the light valve array.

Further, each effective light source is configured to illuminate a different set of light valves with directional light beams having directions corresponding to view directions of the multiview display. The set of light valves may be a multiview pixel of the multiview display, according to various embodiments.

In some embodiments, lenses of the array of lenses are a converging lenses. In these embodiments, each effective light source is provided at the focal plane disposed between the array of lenses and the light valve array. In other embodiments, lenses of the array of lenses are diverging lenses. In these embodiments, each effective light source is provided at the focal plane disposed between the array of lenses and the semi-collimated backlight.

In some embodiments, the method 300 of multiview display operation further comprises illuminating 330 different sets of light valves of the array of light valves with light provided by corresponding different ones of the effect light sources. According to these embodiments, the light provided by each effective light source comprises a plurality of directional light beams.

In some embodiments, the method 300 of multiview display operation further comprises modulating 340 the provided light comprising the plurality of directional light beams. In particular, the directional light beams may be modulated to provide a multiview image, the directional light beams having directions corresponding to view directions of the multiview image. The multiview image may be displayed by or on the multiview display during operation, for example.

Thus, there have been described examples and embodiments of a multiview display and method that include effective light sources of a finite size that are formed from semi-collimated light using an array of lenses, the effective light sources being configured to illuminate a light valve array and provide a multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display comprising:
   a semi-collimated backlight configured to emit semi-collimated light having a predetermined collimation factor;
   an array of light valves arranged as multiview pixels; and
   an array of lenses disposed between the light valve array and the semi-collimated backlight, each lens of the array of lenses corresponding to a different multiview pixel and being configured to provide from the semi-collimated light an effective light source at a focal plane of the lens and having a size between one quarter and two times a size of a light valve of the light valve array,
   wherein the effective light source is configured to illuminate the corresponding different multiview pixel with directional light beams having directions of views of the multiview display.

2. The multiview display of claim 1, wherein the size of the effective light source provided by each lens is equal to the predetermined collimation factor of the semi-collimated light emitted by the semi-collimated backlight multiplied by a focal length of the lens and divided by a value of a refractive index of a material at the focal plane, the predetermined collimation factor being chosen to determine the size of the effective light source.

3. The multiview display of claim 2, wherein the predetermined collimation factor of the semi-collimated light emitted by the semi-collimated backlight is chosen to be proportional to a distance between the effective light source and the light valve array.

4. The multiview display of claim 1, wherein lenses of the array of lenses comprise converging lenses, the effective light sources being provided at the focal plane between the array of lenses and the light valve array.

5. The multiview display of claim 1, wherein lenses of the array of lenses comprise diverging lens, the effective light sources being provided at the focal plane between the lenses and the semi-collimated backlight.

6. The multiview display of claim 1, wherein lenses of the array of lenses comprise one or more of refractive lenses, diffractive lenses, and gradient index lenses.

7. The multiview display of claim 6, wherein the lenses of the array of lenses comprise refractive lenses, a material of the refractive lenses being integral with a material at the focal plane.

8. The multiview display of claim 1, wherein lenses of the array of lenses comprise varifocal lenses configured to facilitate adjusting a location of the focal plane to change a viewing position of the multiview display.

9. The multiview display of claim 1, wherein lenses of the array of lenses are cylindrical lenses having an axis extending in first direction, the multiview pixels each comprising a set of light valves arranged in a row that extends in a second direction across the axis of the cylindrical lenses.

10. The multiview display of claim 1, further comprising optical baffles between lenses of the array of lenses.

11. The multiview display of claim 10, wherein the optical baffles extend from a vicinity of the semi-collimated backlight though the array of lenses and to a vicinity of the array of light valves.

12. The multiview display of claim 1, wherein the semi-collimated backlight comprises:
   a light guide configured to guide light along a length of the light guide as guided light, the guided light being collimated according to the predetermined collimation factor; and
   an angle-preserving scattering element distributed across the light guide length, the angle-preserving scattering element being configured to scatter out a portion of the collimated guided light as the emitted semi-collimated light.

13. The multiview display of claim 1, wherein the semi-collimated backlight comprises a plurality of active light emitters arranged on a substrate.

14. A multiview display comprising:
   a light guide configured to emit semi-collimated light having a predetermined, non-zero collimation factor;
   an array of lenses, each lens of the array of lenses being configured to provide an effective light source at a focal plane of the lens using a portion of the semi-collimated light; and
   an array of light valves arranged in sets of light valves, each lens corresponding to a different one of the sets of light valves,
   wherein effective light sources provided by the array of lenses are configured to provide directional light beams having directions corresponding to view directions of a multiview image, the array of light valves being configured to modulate the directional light beams to provide a multiview image.

15. The multiview display of claim 14, wherein an effective light source provided by a lens of the array of lenses has a size being between one quarter and two times a size of a light valve of the light valve array.

16. The multiview display of claim 14, wherein the predetermined, non-zero collimation factor is chosen to control a size of the effective light source provided by each lens, the size being equal to the predetermined, non-zero collimation factor of the semi-collimated light multiplied by a focal length of the lens and divided by a value of a refractive index of a material between the array of lenses and the light valve array.

17. The multiview display of claim 14, wherein a lens of the array of lenses is a convex lens and the effective light source is provided at the focal plane between the array of lenses and the light valve array.

18. The multiview display of claim 14, wherein a lens of the array of lenses is a refractive lens comprising a refractive material that extends from the array of lenses to the light valve array.

19. The multiview display of claim 14, wherein the light guide comprises:
   a light source configured to provide light to be guided by the light guide as guided light; and
   scattering structure configured to scatter the guide light out of the light guide as the semi-collimated light having the predetermined, non-zero collimation factor.

20. A method of multiview display operation, the method comprising:
   emitting semi-collimated light using a semi-collimated backlight; and
   providing a plurality of effective light sources from the semi-collimated light using an array of lenses disposed between the semi-collimated backlight and an array of light valves, each effective light source of the effective light source plurality being provided by a different lens of the array of lenses at a focal plane of the different lens,
   wherein each effective light source is provided having a size between one quarter and two times a size of a light valve of the light valve array and is configured to illuminate a different set of light valves with directional light beams having directions corresponding to view directions of the multiview display.

21. The method of multiview display operation of claim 20, wherein lenses of the array of lenses are converging lenses, each effective light source being provided at the focal plane disposed between the array of lenses and the light valve array.

22. The method of multiview display operation of claim 20, further comprising:
   illuminating different sets of light valves of the array of light valves with light provided by corresponding different ones of the effect light sources, the light provided by each effective light source comprising directional light beams; and
   modulating the light comprising the directional light beams to provide a multiview image, directions of the directional light beams corresponding to view directions of the multiview image.

* * * * *